United States Patent [19]
Gaudette et al.

[11] Patent Number: 6,044,772
[45] Date of Patent: Apr. 4, 2000

[54] GAME CONTROLLER STAND

[76] Inventors: David O. Gaudette, 1 Range Road; Brendon G. Nunes, 467 Westney Road, S., Unit 3, both of Ajax, Ontario, Canada, L1S 4S7

[21] Appl. No.: 09/235,273

[22] Filed: Jan. 22, 1999

[51] Int. Cl.$^7$ .................................................. A47B 23/00
[52] U.S. Cl. ......................................... 108/43; 108/138
[58] Field of Search .................................. 108/1, 5, 6, 9, 108/138, 144.11, 147.21, 147.22, 147.2, 43; 248/108.1, 108.6, 421; 273/309, 148 B

[56] References Cited

U.S. PATENT DOCUMENTS

| | | | |
|---|---|---|---|
| 2,914,116 | 11/1959 | Gohmann | 108/1 |
| 4,422,640 | 12/1983 | Tamarkin | 108/43 X |
| 4,494,754 | 1/1985 | Wagner, Jr. | 108/43 X |
| 4,494,755 | 1/1985 | Caillouet, Jr. | 108/43 X |
| 4,648,603 | 3/1987 | Hayford, Jr. | 108/43 X |
| 5,263,423 | 11/1993 | Anderson | 108/43 |
| 5,358,208 | 10/1994 | Moseley, III et al. | |
| 5,713,548 | 2/1998 | Boyer et al. | 108/43 X |

FOREIGN PATENT DOCUMENTS

| | | | |
|---|---|---|---|
| 687656 | 3/1965 | Italy | 108/1 |

*Primary Examiner*—Jose V. Chen
*Attorney, Agent, or Firm*—Nixon & Vanderhye P.C.

[57] ABSTRACT

A video game stand facilitates utilization of a control mechanism (such as a steering wheel and steering column connected to a controller), making it easier to play the video game, and in some situations making a home video game much like an arcade game. A controller mounting platform has a substantially flat top surface and is supported by a mechanical support frame constructed so that the height of the platform from the floor may be readily adjusted. The video game control mechanism is positioned on the platform by cooperating hook and loop fasteners, an adapter having a cavity which securely fits a video game control mechanism, and/or an elastic or substantially inelastic belt. The mechanical support frame may be made from plastic or metal tubes, and include a substantially U-shaped base, a substantially U-shaped support, and a diagonal support, the central support slidably connected to the base by a first connection, the diagonal support pivotally connected to the base by a second connection, and the central support pivotally and slidably connected to the diagonal support by a third connection, such as a T-shaped tubular element having an opening aligned with openings on the diagonal support for receipt of an adjustment pin.

11 Claims, 3 Drawing Sheets

GAME CONTROLLER STAND

BACKGROUND AND SUMMARY OF THE INVENTION

Realistic home video games, particularly those which include a control mechanism having a control actuator with a control mechanism connected up to a conventional television set, sometimes can be awkward to effectively utilize because there is no good way to properly mount a control mechanism for effective utilization by the user, or at least not with the same type of ease of use that is typically provided in arcade video games. Lap boards, such as shown in U.S. Pat. Nos. 4,422,640, 4,494,754, 4,494,755, and 4,648,603, can be helpful, however they do not provide the same type of easy utilization that one finds in an arcade game, and the user can become relatively uncomfortable in using the control mechanism, or have his/her utilization restricted in some manner. This is particularly true for driving games which simulate driving a car, truck, or motorcycle over certain terrain, or flying a plane through the air or captaining a ship at sea or racing a speed boat, which typically include a steering wheel and column, or handlebars.

According to the present invention a support assembly facilitating playing of a home video game, a home video game assembly, and a combination of a support assembly and a home video game, are provided which optimize easy utilization of conventional control mechanisms for home video games, but in a relatively inexpensive manner. The structures according to the invention allow a home video game to be as easy to play (either standing up or sitting on a chair) as many arcade games, and is particularly suitable for use with "driving" type games as describe above in which there is a steering wheel, handlebars, or control yoke. The assembly is easily put together, and folds up easily for storage, yet in use is stable, attractive, and adaptable to all sorts of controls.

According to one aspect of the present invention a support assembly facilitating playing of a home video game is provided comprising the following components: A controller mounting platform. A mechanical support frame which supports the mounting platform in such a way that the height of the platform from the floor may be readily adjusted. And means for positioning a video game control mechanism on the platform so that the control mechanism will not be easily inadvertently knocked off the platform.

The platform may have a substantially flat top surface, and the positioning means may comprise hook and loop fasteners attached to the top surface of the platform (and cooperating with corresponding hook or loop fasteners attached to a control mechanism for a home video game). Alternatively, the positioning means may include a belt (either elastic, or substantially inelastic) operatively holding the control mechanism to the platform, and/or appropriate surface manifestations on the control platform which fit the particular control mechanism involved. However, the hook and loop fasteners allow one to easily change the control mechanism that is moved into association with the platform, not requiring that there be any specific surface manifestations on the platform that are dedicated to a particular type of control mechanism. Alternatively, the positioning means may comprise an adaptor dimensioned and configured to engage, with a secure fit, both the platform top surface and the video game control mechanism. For example, the adaptor may be connected to the top surface with removable fasteners, and the adaptor may have a central cavity which securely fits the control mechanism therein. The assembly may further comprise at least one belt engaging the adapter and dimensioned to pass over and engage a control mechanism positioned in the cavity to assist in holding the control mechanism in the cavity.

Preferably the mechanical support frame comprises a base, a central support, and a diagonal support, the central support slidably connected to the base by a first connection, the diagonal support pivotally connected to the base by a second connection, and the central support pivotally and slidably connected to the diagonal support by a third connection. Preferably, the base and the central support are substantially U-shaped, each having two legs and a crosspiece; and wherein the legs of the central support are connected to the legs of the base, and the cross-pieces of the central support and the base are connected to the diagonal support. The assembly typically further comprises plurality of linearly spaced first openings in the diagonal support alignable with at least one second opening in the third connection; and further comprising an adjustment pin which fits in and is removable from aligned first and second openings to provide height adjustment of the platform.

Typically, all of the mechanical support frame major components, the base, the central support, and the diagonal support, are of metal or plastic tubing so that the support is easy and inexpensive to construct, and relatively lightweight. The tubing is preferably substantially circular in cross section, although if slightly more complicated mechanisms are provided the tubing may have other configurations, at least spaced from where the tubing elements are connected together. The third connection may comprise a substantially T-shaped tubular element having a leg portion receiving the diagonal support therein, and a cross portion receiving the base crosspiece therein. The second connection may comprise a substantially T-shaped tubular element having a leg portion receiving a diagonal support therein and a cross portion receiving the central support crosspiece therein. The first connection may comprise first and second tubes engaging the base legs and upstanding portions engaging the central support legs. The tubes and upstanding portions may have a rigid angle between them (e.g. 90°), or a pivotal connection (provided by a simple pivot pin and cooperating flanges with openings for the pivot pin) may be provided.

The invention also relates to a combination providing a support assembly as described above in combination with a video game control mechanism positioned on the platform by the positioning means. The video game control mechanism preferably comprises a control within a casing positioned on the positioning means, and a control actuator extending outwardly from the controller. The control actuator preferably comprises a steering wheel and steering column (which includes within its scope a control yoke), or handlebars. However, a conventional joy stick, or like control mechanism, may also be utilized.

According to yet another aspect of the present invention a home video game assembly is provided comprising: a floor mounted adjustable height platform having a top surface; a video game control mechanism; and means for positioning the video game control mechanism on the platform top surface so that the control mechanism will not be easily inadvertently knocked off the platform.

The video game control mechanism may comprise a controller in a casing positioned by the positioning means, and a control actuator comprising a steering wheel and steering column extending outwardly from the controller.

The platform top surface may be substantially flat, and the positioning means may comprise any of the alternatives discussed above, such as hook or loop fasteners attached to the top surface of the platform and cooperating loop or hook fasteners on the control mechanism (that is, cooperating with the hook and loop fasteners on the platform); or an adapter dimensioned and configured to engage with a secure fit both the platform top surface and a video game control mechanism, the adapter being connected to the top surface with removable fasteners, and the adapter having a central cavity which securely fits the control mechanism therein; and further comprising at least one belt engaging the adapter and dimensioned to pass over and engage the control mechanism positioned in the cavity to assist in holding the control mechanism in the cavity.

It is the primary object of the present invention to provide a simple yet advantageous and effective structure facilitating utilization of a home video game, which optimizes the realism of the game, the comfort of the player while playing the game, and may closely simulate an arcade in a home environment. This and other objects of the invention will become clear from an inspection of the detailed description of the invention and from the appended claims.

DETAILED DESCRIPTION OF THE DRAWINGS

Figure 1:
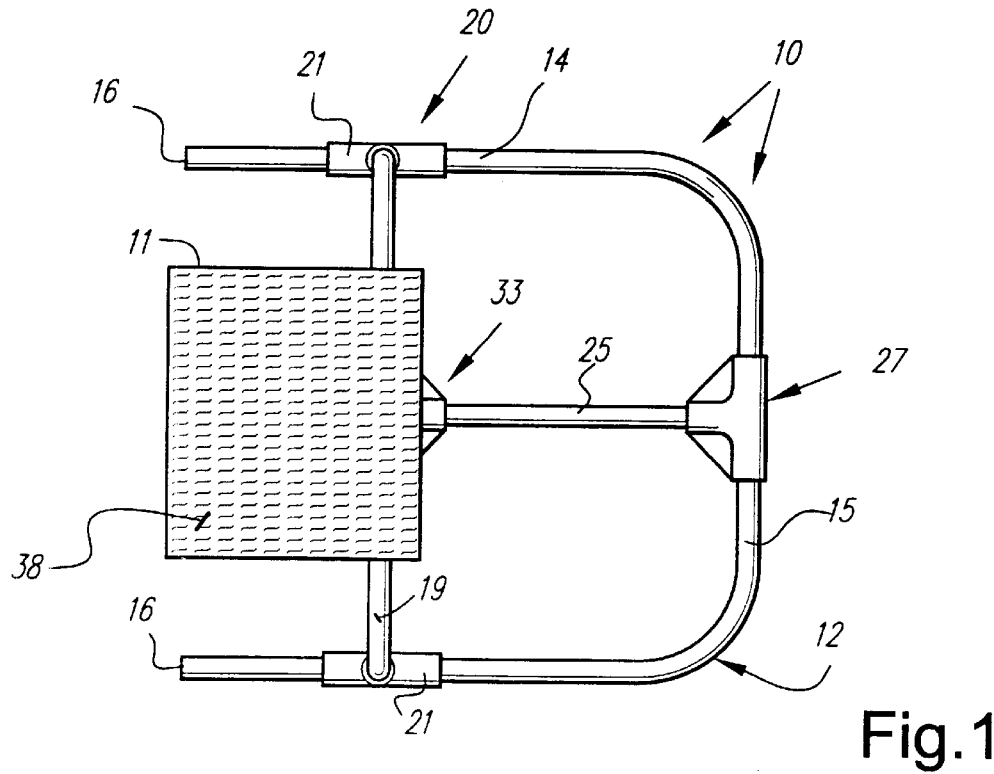
FIG. 1 is a top plan view of an exemplary support assembly according to the present invention.

A support assembly facilitating playing of a home video game is shown generally by reference numeral 10 in FIGS. 1 through 4. The assembly includes a controller mounting platform 11, which preferably has a top substantially flat surface as seen most clearly in FIGS. 2 and 3. The assembly 10 also comprises a mechanical support frame, shown schematically at reference numeral 12 in FIGS. 1 through 4, and means for positioning a video game control mechanism on the platform 11 so that the control mechanism will not easily be inadvertently knocked off the platform 11 (as will be hereinafter described).

The platform 11 may be made of any suitable material such as metal or plastic, may have the edges thereof rounded or scalloped or covered with cushioning material for protective purposes. Also, the top surface need not be completely flat, but may be contoured as necessary or desirable to facilitate playing video games in general or a particular game, and may be covered with other materials, such as a non-skid material.

Figure 4:
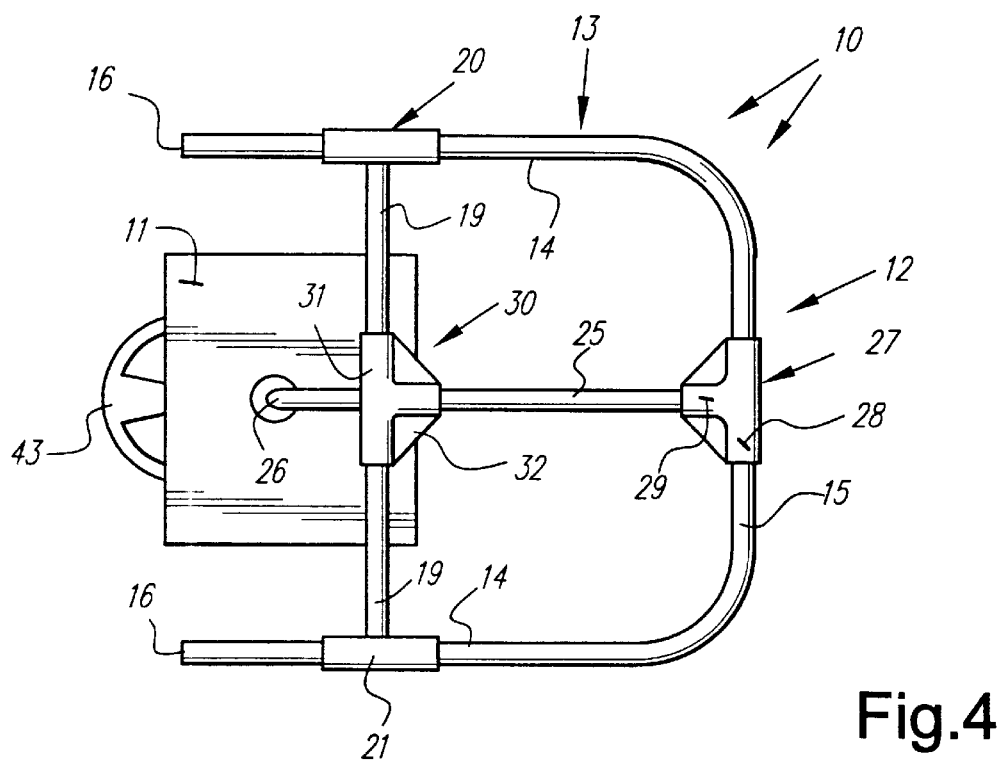

The mechanical support frame 12 includes a base 13 which—as seen most clearly in FIGS. 1 and 4—is preferably substantially U-shaped having two legs 14 and a crosspiece 15, and preferably made out of metal or plastic tubing with a pair of free ends 16 opposite the crosspiece 15. The tubing making the base 13 preferably is completely circular in cross section, although under some circumstances it may have other cross sections or portions of other cross sections.

Figure 2:
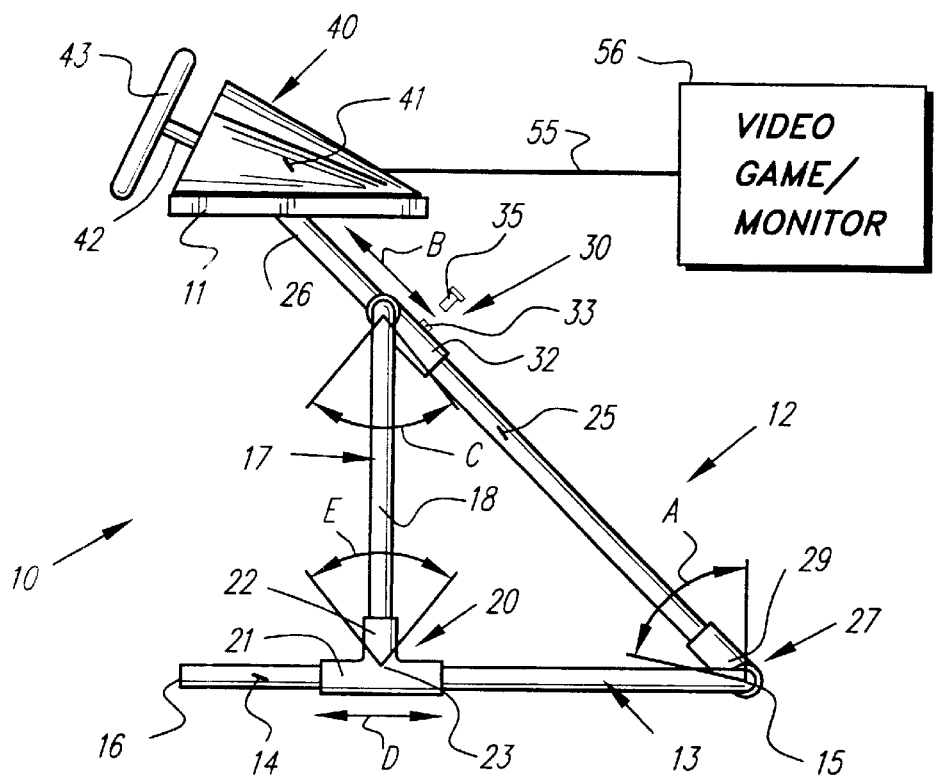
FIGS. 2 through 4 are side, front, and bottom views, respectively, of the support assembly of FIG. 1 with a home video game control mechanism mounted thereon.
Figure 3:
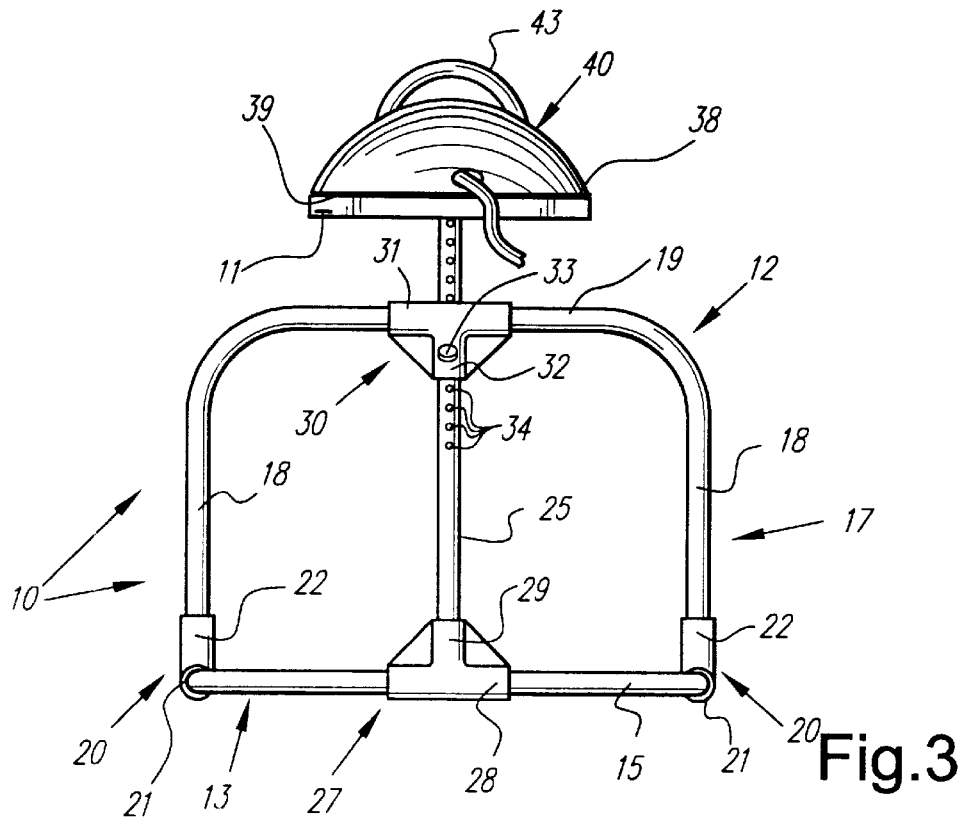

The support frame 12 further comprises a central support shown generally by reference numeral 17 in FIGS. 2 and 3 in particular. The central support 17 preferably is substantially U-shaped, having legs 18 (see FIGS. 2 and 3), and a crosspiece 19 (see FIGS. 1, 3 and 4). The central support 17 also is substantially completely made out of circular cross section plastic or metal tubing, but it too may in some circumstances have a different cross section, or portions of a different cross section.

The base 13 and central support 17 are slidably connected (see arrows D in FIG. 2) together by a first connection, shown schematically by reference numeral 20 as seen in FIGS. 1 through 4. The first connection 20 preferably comprises first and second tubes 21 engaging the base legs 14, and preferably receiving the legs 14 therein, and upstanding portions 22 engaging the central support legs 18, and preferably being tubular and receiving the central support legs 18 therein. A generally T-shaped connection (as seen in FIG. 2) between the portions 21, 22 is typically provided, and the portions 21, 22 may be rigidly connected to each other at a fixed angle (preferably about 90° C.). Alternatively, to facilitate further adjustment options, any suitable conventional pivot mechanism 23 (see FIG. 2) may be provided connecting the components 21, 22 together, such as a conventional pivot pin received by flanges having openings for receipt of the pivot pin therein and connected to both of the elements 21, 22. The pivot axis for the pivot mechanism 23 is horizontal and substantially perpendicular to the direction of elongation of the legs 14 (see arrows E in FIG. 2).

The mechanical support frame 12 further comprises a diagonal support 25, which also preferably is plastic or metal tubing, but typically a single substantially straight piece of tubing, as seen most clearly in FIGS. 1, 3 and 4. At one end of the diagonal support 25 it is connected—as illustrated schematically at 26 in FIGS. 2 and 3—to the platform 11, while at the other end to the base 13. The connection 27 may be a simple rigid connection, or it may be a conventional ball and socket connection with a stiff interface so that it is difficult to rotate the platform 11 with respect to the diagonal support 25 and the components 11, 25 will stay in the position into which they are rotated.

The diagonal support 25 is pivotally connected to the base 13 by a second connection, illustrated schematically at 27 in FIGS. 1 through 4. Preferably, the second connection 27 is substantially T-shaped and tubular, having a cross portion 28 receiving the base crosspiece 15 therein (see FIGS. 3 and 4 in particular) and a leg portion 29 receiving the diagonal support 25 therein. Preferably the difference in diameter between the cross portion 28 and the crosspiece 15 is sufficient (or lubricating material or surfaces are provided) to allow readily free pivotal movement of the components 13, 25 with respect to each other about a horizontal axis substantially concentric with the crosspiece 15, and as indicated by the arrows A in FIG. 2.

The support assembly 10 further comprises a third connection 30 (see FIGS. 3 and 4) for pivotally and slidably connecting the central support 17 to the diagonal support 25. In the preferred embodiment illustrated in the drawings, the third connection 30 comprises a substantially T-shaped tube having a cross portion 31 and a leg 32. The cross portion 31 receives the crosspiece 19 of the central support 17 therein, while the leg portion 32 receives the diagonal support 25 therein. The internal diameters of both the portions 31, 32 are greater than the exterior diameters of the crosspiece 19 and diagonal support 25 so that the crosspiece 25 may easily slide in the direction of arrows B in FIG. 2 with respect to the leg portion 32, and the cross portion 31 may easily rotate about a substantially horizontal axis substantially concentric with the crosspiece 19 with respect to the crosspiece 19, as illustrated by the arrows C in FIG. 2.

In the preferred embodiment the crosspiece 19 of the central support 17 is discontinuous, only including the cross portion 31 of the third connection 30. For the optimal simplicity (although other more complicated connections may be provided) the actual tube forming the crosspiece 19 terminates just short of the diagonal support 25 within each end of the cross portion 31. Alternatively, the leg portion 32 could be displaced from the cross portion 31 so that they were T-shaped only when viewed in FIG. 3, in which the crosspiece 19 would be continuous.

In order to provide ready adjustment, simply by removing one (or a few) adjustment pin (or pins) the relative sliding and pivotal actions as indicated by two or more of the arrows A–E in FIG. 2 may be provided, and in fact the assembly 10 can be collapsed for easy storage. This is preferably accomplished by utilizing one or more openings 33 (see FIGS. 2 and 3) in the leg portion 32 which may be aligned with one of a plurality of openings 34 linearly spaced from each other along the diagonal support 25 so that an adjustment pin 35 may be inserted through the opening 33 and aligned opening 34 in the diagonal support 25 to hold all of the components 13, 17, and 25 of the mechanical support frame 12 in a predetermined adjusted position. Simply by removing the pin 35 an adjustment in the height of the platform 11 may be made by moving the elements 13, 17, 25 with respect to each other.

The platform 11 mounts a home video game control mechanism 40 thereon. In the embodiment illustrated the control mechanism 40 includes a controller in a casing 41, and a control actuator extending outwardly from the controller 41, in this case the control actuator including the steering column 42 and steering wheel 43 (this terminology also encompassing a control yoke). Alternatively, conventional handlebars could be provided instead of the components 42, 43, or any other suitable control actuator, such as a conventional joy stick. In the controller casing 41 are any suitable conventional control components which are necessary for the particular video game desired, including circuitry, microprocessors, sensors, bearings, and the like.

In the embodiment illustrated in FIGS. 1 through 4, the control mechanism 40 is connected to the platform 11 by a means for positioning the control mechanism on the platform 11 top surface so that the control mechanism 40 will not be easily inadvertently knocked off the platform 11. The positioning means in the FIGS. 1 through 4 embodiment comprises hook or loop fasteners 38 (see FIG. 1) on the top surface of the platform 11, and cooperating loop or hook fasteners 39 (seen only schematically in FIG. 3, but conventional) on the bottom of the controller casing 41. In this way the control mechanism 40 may be easily removed from the platform 11, yet will be securely held in place when the video game is being played.

Figure 5:
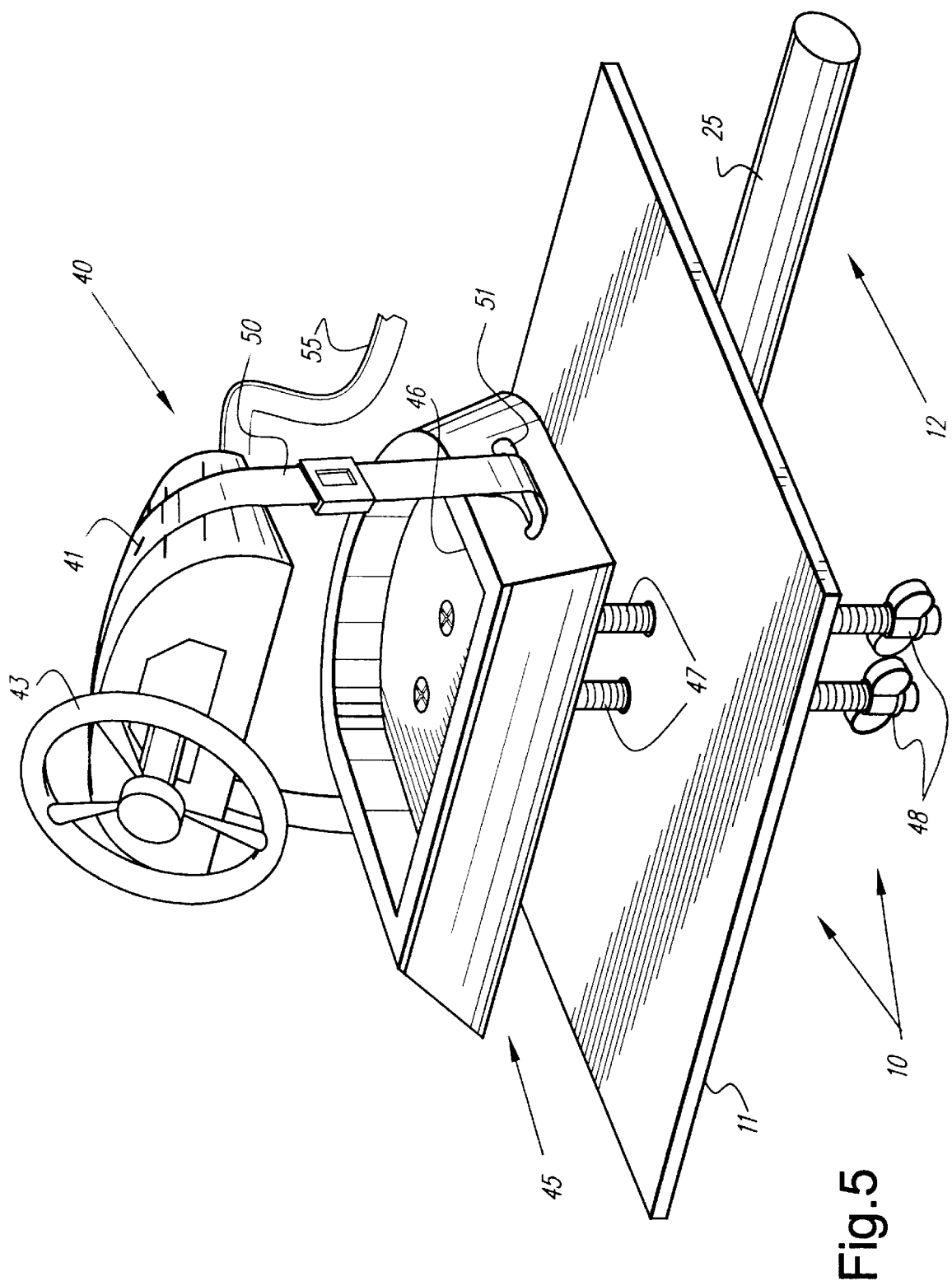
FIG. 5 is a top perspective view of an alternative embodiment of a platform of the support assembly of FIGS. 1 through 4, and the structure for positioning the control mechanism of FIGS. 2 through 4 in association with the platform.

FIG. 5 illustrates another alternative for the positioning means. In this embodiment, an adaptor 45 is provided having a central cavity 46 therein which is contoured to correspond to the shape of the controller casing 41, so that the casing 41 fits securely therein. Removable fasteners, such as the bolts 47 illustrated in FIG. 5, pass through the floor of the adaptor 45 and through openings in the platform 11, and are held in place by wing nuts 48, or the like. An adaptor 45 may be provided which corresponds to each of any number of control mechanisms 40 to specifically fit that control mechanism and hold it on the platform 11. In this way the platform 11 positively accommodates a wide variety of video games, instead of having permanent surfaced manifestations associated therewith.

While there may be a tight enough fit between the controller casing 41 and the cavity 46 so that it is not needed, in the embodiment illustrated in FIG. 5 a belt 50 is also illustrated which passes through openings 51 in the sidewalls of the adaptor 45 and passes around the top of the controller casing 41 and holds it within the cavity 46. The belt 50 may be elastic, or it may be substantially inelastic and adjusted by using a buckle, or other suitable conventional device.

While the positioning means described above are preferred, it is to be understood that any other suitable conventional positioning means may be provided including permanent surface manifestation on the platform 11, suction cups on the platform 11 and/or controller casing 41, etc.

FIG. 2 schematically illustrates one particular utilization of the control mechanism 40, being connected by a conventional cable or cables 55 to another video game unit and/or television or computer monitor 56. On the other video game component/monitor 56 a screen is provided which displays the images that the person playing the video game utilizes in order to effectively play the game. For example, where a control mechanism includes a vehicle control simulation, such as the shaft and wheel 42, 43, respectively, the screen on the monitor 56 will simulate terrain or air space or a waterway over or through which the simulated vehicle moves.

It will be seen that the support assembly 10 allows adjustment of the platform 11 to accommodate players of different heights who can either stand when playing, or sit on a chair while playing, so that they are completely comfortable, and particularly where a vehicle-simulating game is utilized, the player can have freedom of movement of his/her arms which would not be provided with a lap mounted unit. In many ways, especially for vehicles simulating video games, the support assembly 10 according to the invention allows a home video game to simulate an arcade game in functionality.

It will thus be seen that according to the present invention an advantageous support assembly facilitating playing of a home video game, a combination of a support assembly and video game control mechanism, and a home video game assembly, have been provided. While the invention has herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A support assembly facilitating playing of a home video game, comprising:

a controller mounting platform;

a mechanical support frame which supports said mounting platform in such a way that the height of the platform from the floor may be readily adjusted;

means for positioning a video game control mechanism on said platform so that the control mechanism will not be easily inadvertently knocked off said platform; and wherein said mechanical support frame comprises a base, a central support, and a diagonal support, said central support slidably connected to said base by a first connection, said diagonal support pivotally connected to said base by a second connection, and said central support pivotally and slidably connected to said diagonal support by a third connection.

2. A support assembly as recited in claim 1 wherein said platform has a top, substantially flat, surface; and wherein said positioning means comprises hook or loop fasteners attached to said top, substantially flat, surface of said platform.

3. A support assembly as recited in claim 1 wherein said base and said central support are substantially U-shaped, each having two legs and a cross-piece; and wherein said legs of said central support are connected to said legs of said base, and said cross-pieces of said central support and said base are connected to said diagonal support.

4. A support assembly as recited in claim 3 further comprising a plurality of linearly spaced first openings in said diagonal support alignable with at least one second opening in said third connection; and further comprising an adjustment pin which fits in and is removable from aligned first and second openings to provide height adjustment of said platform.

5. A support assembly as recited in claim 3 wherein said diagonal support and said base crosspiece are substantially circular in cross-section; and wherein said second connection comprises a substantially T-shaped tubular element having a leg portion receiving said diagonal support therein, and a cross-portion receiving said base crosspiece therein.

6. A support assembly as recited in claim 5 wherein said central support crosspiece is substantially circular in cross section; and wherein said third connection comprises a substantially T-shaped tubular element having a leg portion receiving said diagonal support therein, and a cross-portion receiving said central support crosspiece therein.

7. A support assembly as recited in claim 6 wherein said first connection comprises first and second tubes receiving said base legs therein, and upstanding portions engaging said central support legs.

8. A support assembly as recited in claim 1 further comprising a plurality of linearly spaced first openings in said diagonal support alignable with at least one second opening in said third connection; and further comprising an adjustment pin which fits in and is removable from aligned first and second openings to provide height adjustment of said platform.

9. A combination comprising a support assembly as recited in claim 1 in combination with a video game control mechanism positioned on said platform by said positioning means.

10. A combination as recited in claim 9 wherein said video game control mechanism comprises a controller in a casing positioned by said positioning means, and a control actuator extending outwardly from said controller.

11. A combination as recited in claim 10 wherein said control actuator comprises a steering wheel and steering column.

* * * * *